US012180650B2

(12) United States Patent
Wicher et al.

(10) Patent No.: US 12,180,650 B2
(45) Date of Patent: Dec. 31, 2024

(54) TRANSFER MATERIAL FOR SUBLIMATION PRINTING BASED ON PAPER AS THE CARRIER, WITH AN INK BLOCKING FUNCTION

(71) Applicant: SCHOELLER TECHNOCELL GMBH & CO., KG, Deutschland (DE)

(72) Inventors: Martina Wicher, Deutschland (DE); Michael Jocher, Deutschland (DE); Knut Hornig, Deutschland (DE); Sebastian Scholz, Deutschland (DE); Martin Goeppert, Deutschland (DE)

(73) Assignee: SCHOELLER TECHNOCELL GMBH & CO. KG, Deutschland (DE)

( * ) Notice: Subject to any disclaimer, the term of this patent is extended or adjusted under 35 U.S.C. 154(b) by 0 days.

(21) Appl. No.: 18/548,753

(22) PCT Filed: Mar. 2, 2022

(86) PCT No.: PCT/EP2022/055268

§ 371 (c)(1),
(2) Date: Sep. 1, 2023

(87) PCT Pub. No.: WO2022/184768

PCT Pub. Date: Sep. 9, 2022

(65) Prior Publication Data

US 2024/0158987 A1 May 16, 2024

(30) Foreign Application Priority Data

Mar. 2, 2021 (EP) .................................... 21160232

(51) Int. Cl.
*B41M 5/025* (2006.01)
*B41M 5/035* (2006.01)
(Continued)

(52) U.S. Cl.
CPC ........... *D06P 5/004* (2013.01); *B41M 5/0256* (2013.01); *B41M 5/0355* (2013.01);
(Continued)

(58) Field of Classification Search
CPC .......... D06P 5/004; D06P 1/5228; D06P 3/52; B41M 5/0256; B41M 2205/02;
(Continued)

(56) References Cited

U.S. PATENT DOCUMENTS 5,310,589 A 5/1994 Nagashima
7,943,214 B1 5/2011 Bamberg et al.
2003/0117481 A1 * 6/2003 Kometani ............ B41M 7/0027 347/213

FOREIGN PATENT DOCUMENTS

CN 107690389 A 2/2018
DE 102006001979 A1 * 7/2007 ............. D21H 17/37
(Continued)

OTHER PUBLICATIONS

China 202280018625.3 Search Report dated Dec. 4, 2023.
(Continued)

*Primary Examiner* — Yaovi M Ameh
(74) *Attorney, Agent, or Firm* — Honigman LLP

(57) ABSTRACT

The invention relates to a transfer material for dye sublimation processes, comprising a base paper, which is coated on one side with a color-receiving layer, wherein the base paper contains at least 1.5% by weight, based on the mass of the pulp, of a polymer dispersion selected from the group consisting of polyacrylates, polyesters, polyolefins or mixtures thereof. The invention further relates to a process for producing a transfer material according to the invention, comprising the steps of: (a) producing a base paper on a paper machine, wherein at least 1.5% by weight, based on the mass of the pulp, of a polymer dispersion selected from
(Continued)

the group consisting of polyacrylates, polyesters, polyolefins or mixtures thereof are added to the pulp suspension during production of the base paper; (b) drying and smoothing the base paper; (c) applying the color-receiving layer to a surface of the base paper; and (d) drying the transfer material obtained in step (c). The invention further relates to a process for transferring an image onto a receiving material by sublimation, wherein a transfer material according to the invention is printed with an image by way of the inkjet printing process, and the image is transferred onto a receiving material by sublimation.

13 Claims, 3 Drawing Sheets

(51) Int. Cl.

| | |
|---|---|
| ***D06P 1/52*** | (2006.01) |
| ***D06P 5/28*** | (2006.01) |
| ***D21H 17/37*** | (2006.01) |
| ***D21H 17/44*** | (2006.01) |
| ***D21H 17/56*** | (2006.01) |
| ***D21H 19/38*** | (2006.01) |
| ***D21H 19/60*** | (2006.01) |
| ***D21H 19/82*** | (2006.01) |
| *D06P 3/52* | (2006.01) |
| *D21H 17/35* | (2006.01) |
| *D21H 17/53* | (2006.01) |
| *D21H 19/40* | (2006.01) |
| *D21H 27/00* | (2006.01) |

(52) U.S. Cl.
CPC .......... *D06P 1/5228* (2013.01); *D21H 17/37* (2013.01); *D21H 17/44* (2013.01); *D21H 17/56* (2013.01); *D21H 19/385* (2013.01); *D21H 19/60* (2013.01); *D21H 19/822* (2013.01); *B41M 2205/02* (2013.01); *D06P 3/52* (2013.01); *D21H 17/35* (2013.01); *D21H 17/53* (2013.01); *D21H 19/40* (2013.01); *D21H 27/00* (2013.01)

(58) Field of Classification Search
CPC ..... B41M 5/0355; D21H 17/37; D21H 17/44; D21H 17/56; D21H 19/385; D21H 19/60; D21H 19/822; D21H 17/35; D21H 17/53; D21H 19/40; D21H 27/00
See application file for complete search history.

(56) References Cited

FOREIGN PATENT DOCUMENTS

| | | | | | |
|---|---|---|---|---|---|
| JP | H02106397 | A | | 4/1990 | |
| JP | 1999038554 | A | | 2/1999 | |
| JP | 1999277917 | A | | 10/1999 | |
| JP | 2006200071 | A | | 8/2006 | |
| JP | 2007242070 | A | | 9/2007 | |
| JP | 2009269324 | A | | 11/2009 | |
| JP | 2017078128 | A | | 4/2017 | |
| WO | WO-0073570 | A1 | * | 12/2000 | ............ B41J 2/0057 |
| WO | WO-03006736 | A1 | * | 1/2003 | .......... B41M 5/0256 |
| WO | 2018139925 | A1 | | 8/2018 | |

OTHER PUBLICATIONS

PCT/EP2022/055268 International Search Report dated May 19, 2022.
EP 21160232.1 European Search Report dated Jul. 26, 2021.

* cited by examiner

TRANSFER MATERIAL FOR SUBLIMATION PRINTING BASED ON PAPER AS THE CARRIER, WITH AN INK BLOCKING FUNCTION

CROSS-REFERENCE TO RELATED APPLICATIONS

This application is a National Stage Application and claims priority under 35 U.S.C. § 371 to Patent Cooperation Treaty application PCT/EP2022/055268, filed Mar. 2, 2022, which claims the benefit of European Patent Application No. 21160232.1 filed Mar. 2, 2021. Priority is claimed to these applications and the disclosures of these prior applications are considered part of the disclosure of this application and to the extent allowed the entire contents of the aforementioned applications are incorporated by reference herein.

The invention relates to a transfer material for the dye sublimation process and to a method for the preparation thereof. The invention further relates to a method for transferring an inkjet print image from the transfer paper according to the invention onto a receiving material.

Transfer printing processes, in which a flexible, sheet-like transfer material is first printed, and the print image is transferred from it to the object to be printed, are available for printing materials, such as textiles or rigid bodies, which for mechanical reasons cannot be printed well by direct printing processes. A specific embodiment of such a transfer printing process is the dye sublimation process, which is described, for example, in B. Thompson: Printing Materials—Science and Technology (1998) on page 468. In this method, the image to be printed is applied to the transfer material using printing inks which are evaporated after the print has been dried by exposure to heat and deposited out of the gas phase again as an image onto the material that is ultimately to be printed. The sublimation dyes can advantageously be applied to the transfer material by digital printing—in particular, the inkjet printing process—which enables individual and personalized prints on textiles, for example. Printing inks for the inkjet printing process with dyes which can be transferred to the final print substrate by means of sublimation are described, for example, in DE 102 46 209 A1.

Typical transfer materials onto which the print image to be transferred is printed by means of inkjet printing technology comprise a carrier, e.g., a base paper, which is coated with a color-receiving layer.

A transfer material suitable for the dye sublimation process should, on the one hand, allow good absorption of the ink liquid when printing with the image to be transferred, since the print sharpness suffers otherwise, while, on the other hand, as little sublimable dye as possible should be lost during the transfer of the print image onto the material to be printed. Ideally, a loss of sublimable dye resulting from penetrating the paper interior of the carrier and the surfaces of the transfer presses—so-called ink penetration—should be completely prevented when the print image is transferred from the transfer material to the material to be printed.

The transfer materials on the market previously used for sublimation printing can basically be divided into two groups. On the one hand, there is the group of transfer materials in which film-forming binders are used in the color-receiving layer and the film-forming binders already have a certain barrier function against the penetration of inks. On the other hand, microporous color-receiving layers are used, which predominantly do not use film-forming binders in the color-receiving layer. In these last-mentioned products, the penetration of the ink is resolved by applying at least one barrier layer on the rear side of the carrier or between the carrier and the color-receiving layer. However, problems arise due to the tackiness of the barrier layers both during production and in subsequent application. A further problem in the application is the significant deterioration of the curl properties (undesired rolling of the paper) by applying a barrier layer.

EP 1 101 682 A1 describes a coated paper which has low air permeability on the side to be printed. This is intended to prevent a portion of the sublimable dyes from penetrating the porous paper interior of the carrier during the sublimation transfer step and thus being unavailable for transfer to the material that is ultimately to be printed. However, such papers with a low porosity on the side to be printed only absorb the inkjet ink very slowly and—in particular, at high print speeds—lead to slow drying and to ink bleeding on the surface, and thus to an unsatisfactory print sharpness.

This also applies to the transfer materials described in EP 1 878 829 A1 with swellable, non-porous color-receiving layers. EP 1 878 829 A1 describes that the use of synthetic polymers, such as polyethylene (PE), polyester (PES), polyacrylates, and further synthetic thermoplastic polymers as an additional coating on the base paper would lead to a deterioration in the quality properties of the print image transferred by the dye sublimation method onto the material to be printed, since these polymers have a disadvantageously high color retention capacity and thus result in a lower transfer rate of the dye.

US 2008/229962 A1 proposes a coating for a base paper which contains silica and a comparatively small amount of binder, and thus has a considerable air permeability. Although good absorption of the ink liquid during the printing of the transfer material with the image to be transferred is achieved thereby, this coating does not sufficiently prevent penetration of the dye, i.e., a loss of sublimable dye as a result of penetrating the paper interior and the surfaces of the transfer presses during transfer to the material that is ultimately to be imaged.

EP 3 302 991 A2 also describes a porous color-receiving layer with a small amount of binder and inorganic fillers, which is characterized by good ink absorption and print quality. To avoid the loss of sublimable dye, barrier layers are described on the rear side of the transfer material or between the base paper and the ink receiving layer. Due to the polymer-based barrier layers applied on one side, however, the curl property of the base paper increases, which is problematic in the further processing. In addition, a barrier layer applied on the rear side can lead to a tackiness of the rear side and thus to an undesired adhesion of the transfer material on the surfaces of the transfer presses during the application thereof in the dye sublimation process.

A so-called thermal transfer material is also described in DE 10 2014 116550 A1. In particular, it is proposed to use thermoplastic particles having a melting point of 35° C. to 150° C. and an average particle size of 0.3 to 5 μm in the color-receiving layer. By means of the thermoplastic particles, the adhesion of the printed color-receiving layer to the front side of the thermal transfer material is to be optimized on flat textiles during the transfer of the print image in the dye sublimation method. The color-receiving layer of DE 10 2014 116550 A1 has a binder content of 55 to 80% bone dry, and can also contain pigments. In the case of this binder content in the color-receiving layer, a closed, film-like layer, which is non-porous, is also present in the presence of pigments. A disadvantage of the procedure described in DE 10 2014 116550 A1 is therefore that the drying speed is significantly less than when microporous color receiving layers are used, so that the inkjet ink liquid is absorbed only very slowly. At high print speeds, the slow drying leads to the ink running on the surface of the transfer material and thus to an unsatisfactory print sharpness of the print image. In addition, a large amount of thermoplastic particles must be used in the color-receiving layer in order to even obtain a noticeable adhesion of the front side of the thermal transfer material on the textile. Due to the high amount of thermoplastic particles in the color-receiving layer, the print quality (line sharpness) and the transfer quality (optical densities on textile) of the transfer material can be greatly impaired. It is also not possible with this approach to control the textile adhesion independently of the print and transfer quality.

Against the background of the prior art, the object of the invention is to provide a transfer material for the dye sublimation process, which transfer material does not allow or allows only very slight penetration of the sublimable dyes through the carrier of the transfer material and with which transfer material the known problems of the prior art transfer materials do not occur.

This object is achieved by a transfer material for the dye sublimation process, comprising a base paper, which is coated on one side with a color-receiving layer, wherein the base paper contains at least 1.5 wt %, relative to the dry weight of the pulp, of a polymer dispersion selected from the group consisting of polyacrylates, polyesters, polyolefins, or mixtures thereof.

Surprisingly, it has been found that the introduction of at least the stated amount of specific polymer dispersions and mixtures thereof into the base paper of the transfer material according to the invention leads to a distinct improvement in and even prevention of the penetration of sublimable dyes when used in the dye sublimation process. Without wishing to be bound to scientific theories, the polymer dispersion in the base paper of the transfer material according to the invention appears to form a barrier against the sublimable dye inks, without the base paper needing to be sealed completely by means of an additional barrier layer. Here, the barrier effect appears to be based upon sorption processes between the sublimable dyes and the specific polymers. Because an additional barrier layer is not required in the transfer material according to the invention, the transfer material according to the invention does not have the disadvantages associated with the application of said barrier layer, such as tackiness, impaired curl properties, and too low a porosity of the color-receiving layer, and the slow drying and bleeding of the ink on the surface and unsatisfactory print sharpness associated therewith.

The transfer material according to the invention comprises a base paper.

The base paper is preferably an uncoated or surface-sized paper. In addition to pulp fibers, sizing agents, such as alkylpentene dimers, fatty acids, and/or fatty acid salts, the base paper can contain epoxidized fatty acid amides, alkenyl or alkyl succinic anhydride, starch, tree resins, wet solids, such as polyamine-polyamide epichlorohydrin, dry solids, such as anionic, cationic or amphoteric polyamides, optical brighteners, pigments, dyes, defoamers, and further chemical additives known in the paper industry. Typically, sizing agents with an added amount of 0.2% or less, wet solids with an added amount of 0.5% or less, and dry solids with an added amount of 1.0% or less, are used in paper production. In this case, the added amounts are metered in as low as possible in order to avoid costs and unnecessary and uncontrolled multiple circuits of the agents in the materials cycle.

The base paper may be surface-sized. Suitable sizing agents for this purpose are, for example, polyvinyl alcohol or starch dextrins or modified starches, such as oxidized starches or starch ethers. The base paper can be produced on a Fourdrinier machine with or without a top wire. The basis weight of the base paper can be 30 to 200 g/m$^2$, and in particular 40 to 120 g/m$^2$. The base paper can be used in uncompacted or compacted form (smoothed). Base papers having a density of 0.6 to 1.05 g/cm$^3$, and in particular 0.70 to 0.9 g/cm$^3$, are particularly suitable. The smoothing can take place in the usual way with calendering.

Any pulp that is typical for this purpose can be used for the production of the base paper. The pulp for the production of the base paper is preferably a *eucalyptus* pulp having a fibrous material content of less than 200 μm after grinding of 10 to 35 wt % and an average fiber length of 0.5 to 0.75 mm. It has been found that the use of a pulp having a limited fiber content of less than 200 μm reduces the loss of rigidity that occurs when using a filler.

It is also possible to use hardwood pulp (NBHK—Northern Bleached Hardwood Kraft Pulp) and softwood pulp.

According to the invention, the base paper contains at least 1.5 wt %, relative to the mass of the pulp, of a polymer dispersion selected from the group consisting of polyacrylates, polyesters, polyolefins, or mixtures thereof. (in the following, also polymer dispersion according to the invention).

The use of at least 1.5 wt % of the polymer dispersion according to the invention surprisingly leads to a significant improvement in the barrier properties of the transfer material, without the need for an additional barrier layer, as in the prior art. The quantities of the polymer dispersion used according to the invention are clearly higher than the quantities of typical polymer dispersions used in the production of a base paper, such as, for example, sizing agents, wet solids, or dry solids.

The polyacrylates used according to the invention are, for example, styrene-alkyl acrylate copolymer or methyl methacrylate. The alkyl in the styrene-alkyl acrylate copolymer preferably means methyl, ethyl, propyl, butyl, and/or hexyl. The alkyl in the styrene-alkyl acrylate copolymer is preferably ethyl or butyl. Copolymers can be used as mixtures of the aforementioned alkyl groups in the alkyl acrylate portion of the styrene-alkyl acrylate copolymer. The polyesters used in accordance with the invention are preferably selected from the group consisting of polybutylene terephthalate, polyethylene terephthalate, polylactide, polytrimethylene terephthalate, polyethylene naphthalate, polycarbonate, polyester carbonate. Polyethylene, polybutylene, polymethylpentene, and polyisobutylene, for example, can be used as polyolefins.

According to a preferred embodiment of the invention, the base paper contains at least 2 wt %, in particular at least 2.5 wt %, and preferably at least 3 wt %, relative to the mass of the pulp, of a polymer dispersion according to the invention. It has been found that such a transfer material has a further improved barrier effect, so that there is again a significant reduction in the ink penetration in the case of such a transfer material. It has proven to be particularly practical if the polymer dispersion is distributed uniformly within the thickness of the base paper. This ensures a constant barrier effect over the entire area of the base material of a particularly high degree.

In addition to pulp fibers, portions of other natural or synthetic fibers can also be used to produce the base paper. Preferably, the content of the other fibers in the total fiber mass is below 40 wt %, and more preferably the content of other fibers is below 20 wt %.

According to a preferred embodiment, the base paper contains at least 5 wt %, in particular between 5 and 20 wt %, and very particularly preferably between 8 and 15 wt %, relative to the mass of the pulp, of synthetic fibers—in particular, polyethylene fibers or polyethylene terephthalate fibers. The synthetic fibers preferably have a length between 2 and 6 mm, and preferably between 4 and 6 mm. The diameter of the synthetic fibers can be between 30 and 110 μm, and preferably between 50 and 100 μm.

It has been found that the barrier effect of the transfer material according to the invention can be further enhanced by the additional use of synthetic fibers in the base paper.

According to a preferred embodiment of the invention, the ink penetration of the transfer material according to the invention is below 30%, preferably below 20%, and particularly preferably below 15%. In practice, ink penetration of up to 30% is acceptable, but leads to a loss of sublimable dye. A transfer material with an ink penetration of below 20% or less leads to significantly less dye loss and is thus more efficient overall.

The base paper can contain fillers and pigments.

Fillers and pigments for the production of the base paper can, for example, be kaolins, calcium carbonate in its natural form, such as limestone, marble, or dolomite stone, precipitated calcium carbonate, calcium sulfate, barium sulfate, titanium dioxide, talc, silica, aluminum oxide, aluminum and magnesium silicates or silicas, and mixtures thereof in the base paper.

According to a preferred embodiment, the base paper according to the invention contains at least 5 wt %, relative to the mass of the pulp, of one or more pigments. The use of hydrophobic pigments, and especially those selected from the group consisting of kaolin, calcium carbonate, aluminum and magnesium silicates or silicas, and mixtures thereof, has proven to be particularly suitable in practice. It has been found that the use of such hydrophobic pigments in the base paper according to the invention further improves the barrier effect for sublimable dyes. Without wishing to be bound to scientific theories, this also appears to be based upon interactions or sorption processes between the sublimable dyes and the hydrophobic pigments, by means of which the migration rate of the sublimable dyes is significantly reduced. This interaction can be further enhanced by the use of hydrophobic pigments with a high specific surface area. Therefore, the hydrophobic pigment preferably has a specific surface area greater than 80 $m^2/g$.

The base paper of the transfer material according to the invention is coated on one side with a color-receiving layer. The color-receiving layer is arranged on the side of the base paper to be printed.

The color-receiving layer can be a porous or microporous layer. A porous color-receiving layer in the sense of the invention contains, prior to printing, a series of air-filled cavities (pores). These pores can absorb ink very quickly due to capillary forces and thus lead to rapid drying of the print image. In contrast to film-like color-receiving layers, such porous color-receiving layers have a high content of pigment particles and, comparatively, only a low content of (film-forming) binders.

Porous color-receiving layers have a high air permeability, which can be determined by the Bendtsen method. The pore volume thereof can be detected and determined, for example, by liquid absorption measurements or by mercury porosimetry.

The porous color-receiving layer thus contains inorganic pigment and binder. Particularly preferred are pigments having an anionic, neutral, or only weakly cationic surface, such as silica, calcium carbonate, kaolin, talc, bentonite, aluminum oxides, or aluminum oxide hydrates. However, fine-particle polymeric compounds may also be present, with high-melting thermoplastic or thermosetting polymers being preferred. In a further embodiment of the invention, the color absorption layer can also contain a mixture of two or more pigments. The pigments preferably have an average particle size of 100 nm to 30 μm, and more preferably of 200 nm to 10 μm.

The color-receiving layer preferably additionally contains a polymeric binder, and preferably a hydrophilic polymeric binder. The binder may be a water-soluble binder or a binder dispersed in water. Preferred binders are styrene copolymers, polyvinyl alcohol, starch, modified starch, polyvinyl acetate, acrylates, or polyurethane dispersions. The mass ratio of pigment to binder is 100:1 to 100:50, and preferably 100:40 to 100:2.

The application weight of the color-receiving layer is preferably 1 $g/m^2$ to 50 $g/m^2$, and more preferably 3 $g/m^2$ to 30 $g/m^2$. The air permeability of the color-receiving layer, measured according to Bendtsen, is preferably greater than 100 mL/min, and particularly preferably 200 mL/min to 500 mL/min.

The color-receiving layer is preferably applied to the paper base by applying aqueous coating material, wherein any application method that is customary in the paper industry can be used. Application by means of blade, scraper, film press, or curtain coating is preferred. Particularly preferred is a multi-layer curtain coating method.

The coating compounds may contain further typical additives, such as wetting agents, thickeners, rheological aids, dyes, and optical brighteners.

One or more further layers can, in the transfer material according to the invention, be arranged between the base paper and the color-receiving layer. These are preferably layers containing a hydrophilic binder.

The invention further provides a process for producing the base material according to the invention, comprising the following steps:

(a) producing a base paper on a paper machine, wherein at least 1.5 wt %, relative to the mass of the pulp, of a polymer dispersion selected from the group consisting of polyacrylates, polyesters, polyolefins, or mixtures thereof are added to the pulp suspension during production of the base paper;
(b) drying and smoothing the base paper;
(c) applying the color-receiving layer to a surface of the base paper; and
(d) drying the transfer material obtained in step (c).

In comparison to the methods known in the prior art for the production of transfer materials for the dye sublimation method, the method according to the invention is characterized in that the step of additionally applying a barrier layer between the color-receiving layer and the base paper or on the rear side (the one without a side coated with a color-receiving layer) of the base paper is omitted, since the barrier effect is produced by adding the polymer dispersion during the production of the base paper. This saves upon process steps and raw materials during the production of the transfer material. The method according to the invention is thus significantly more efficient than the procedures known from the prior art.

The specifications given above in connection with the transfer material according to the invention apply correspondingly to the method according to the invention.

According to a preferred embodiment of the method according to the invention, the method comprises the following additional step (a1) between step (a) and step (b):

(a1) impregnating the base paper with an impregnation solution comprising at least 1.0 g/$m^2$ of a polymer dispersion selected from the group consisting of polyacrylates, polyesters, polyolefins, or mixtures thereof, in a size press or film press.

The impregnation solution can comprise the same polymer dispersion which was already added to the pulp suspension for production of the base paper in step (a). Additional impregnation of the base paper leads to further reduction in the ink penetration without productivity losses in the wet end of the paper machine. The use of high amounts of polymer dispersion in the wet end of the paper machine is typically avoided, since this leads to disruptions to the sensitive balance of the white-water circuit based upon charge and colloidal interactions of the particles, which has a disadvantageous effect upon the productivity of the production process. The option of adding the polymer dispersion both in the wet end of the paper machine and in the size press or film press means that the process-related risk of worsening the production efficiency can be reduced, since a specific total amount of polymer dispersion can be introduced at two different points in time during the paper production, so that an excessively high concentration of the polymer dispersion is not produced locally in the wet end of the paper machine or in the size press or film press, and thus the disadvantages described above do not occur.

According to a preferred embodiment, the base paper is impregnated in step (a1) with an impregnation solution which is at least 1.5 g/$m^2$, preferably at least 2.0 g/$m^2$, particularly preferably at least 2.5 g/$m^2$, and very particularly preferably at least 3.0 g/$m^2$, of the polymer dispersion according to the invention.

In addition to the polymer dispersion according to the invention, the impregnation solution used in step (a1) may contain the additives typically used in paper production and described above in connection with the production of the base paper, such as sizing agents, wet solids, dry solids, optical brighteners, fillers, pigments, dyes, defoamers, and further chemical additives known in the paper industry.

Finally, the present invention also relates to a method for transferring an image onto a receiving material by sublimation, wherein a transfer material according to the invention is printed with an image by way of the inkjet printing process, and the image is transferred to a receiving material by sublimation.

According to a preferred embodiment of the method according to the invention, the receiving material is selected from polyester fabric, polyester nonwoven, or a material coated with polyester.

FIG. 1 schematically shows a cross-section through a transfer material according to the invention. In this case, 1 denotes a base made of paper. The base paper contains the polymer dispersion according to the invention. The base paper is coated on one side with a color-receiving layer 2 for inkjet printing.

FIG. 2 shows a print file of a commercially available sublimation desktop printer used for determining the ink penetration. The print file includes 10 round color fields with differently declining amounts of ink to be printed in black. The print field at the top left is printed with 100% ink quantity, and the following ones with 10% less ink quantity in each case. Under the print fields, the designation of the field is in % and is specified as 100%—applied ink quantity in %. For example, the ink field printed with 80% ink quantity is denoted by the inscription 20%.

Figure 5:
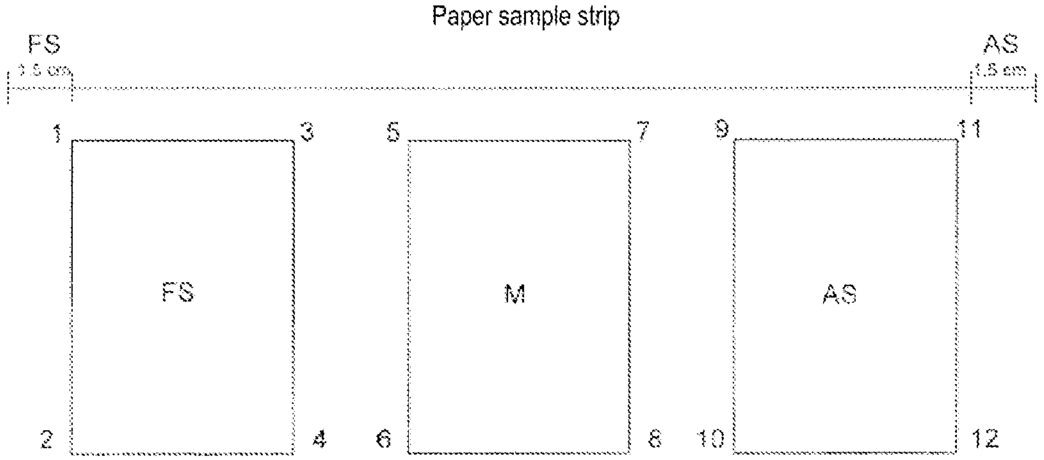

FIG. 5 shows three DIN A4 samples of transfer materials for determining the curl average. Sample FS edge (FS) is a DIN A4 sample taken approx. 1.5 cm from the tender side edge of the paper sample strip, sample M is a DIN A4 sample taken from the middle of the paper web and sample AS is a DIN A4 sample taken approx. 1.5 cm from the drive edge (AS edge). The numbers 1-4, 5-8, and 9-12 mark the measured four corner points of the respective sample.

The following examples are used to further explain the invention.

EXAMPLES

Production of a Base Paper

A *eucalyptus* pulp was used to produce the base paper. For grinding, the pulp was ground as an approximately 5% aqueous suspension (thick stock) with the aid of refiners to a grinding degree of 25° SR. The concentration of the pulp fibers in the thin material was about 1 wt %, relative to the mass of the pulp suspension. Further additives were added to the thin stock, such as 0.15 wt % of a neutral sizing agent, alkyl ketene dimer (AKD), 0.60 wt % of a wet strength agent, polyamine-polyamide epichlorohydrin resin (Kymene®), 1.0 wt % starch (C-Bond HR 35845), and 30 wt % of a natural milled $CaCO_3$. The quantities refer to the pulp mass. The thin stock, the pH of which was adjusted to approximately 7.5, was brought from the headbox onto the wire of the paper machine, whereupon the sheet was formed with dewatering of the web in the wire section of the paper machine. In the press section, the paper web was dewatered further to a water content of 60 wt %, relative to the web weight. Further drying was carried out in the drying section of the paper machine using heated drying cylinders. A base paper having a basis weight of 63 g/$m^2$, a filler content of 18 wt %, and a moisture of about 5.5% was produced.

Production of a Coating Material for the Color-Receiving Layer 557 g of an aqueous 9.5 wt % solution of a partially saponified polyvinyl alcohol (Mowiol® 18-88 from Kuraray) are added to 441 g of a dilute dispersion of precipitated calcium carbonate (Precarb® 800 from Schaefer Kalk) having a solids content of 48 wt %, and the mixture is mixed using a dissolver stirrer. 0.5 g of wetting agent, Surfynol© 440, from Air Products is then added. The coating material obtained has a solids content of 26.6 wt %, a viscosity of 150 mPas, a pH of 7.5, and a surface tension of 36 mN/m.

Production of the Transfer Material

The surface-sized, dried, and smoothed base paper obtained is coated on one side with the coating material for the ink receiving layer.

Preparation of the Examples According to the Invention and the Comparative Examples The transfer materials listed in the following table were prepared according to the method described above. In each case, the barrier component given in the first column of Table 1 was used in exchange for *eucalyptus* pulp during the production of the base paper. The first comparative example corresponds to the base material produced, without addition of a further barrier component during the production of the base paper in exchange for pulp, and is accordingly referred to as "without barrier component." The comparative example, which is referred to in the first column of the table as "without barrier component with additional barrier layer," was produced according to the above-mentioned method, but, in this case, no barrier component was added to the base paper during its production, and the base paper on the side opposite the color-receiving layer was additionally provided with a barrier layer made of a thermoplastic polymer, such as, for example, a fully-hydrolyzed polyvinyl alcohol (e.g., Mowiol® 28-99).

Determining the Ink Penetration

The sublimation transfer paper to be tested is stored in DIN A4 format for at least 1 h under standard climatic conditions 23° C. and 50% humidity in the print chamber.

Figure 1:
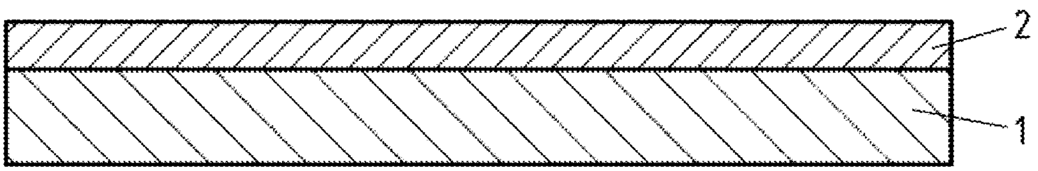
Figure 2:
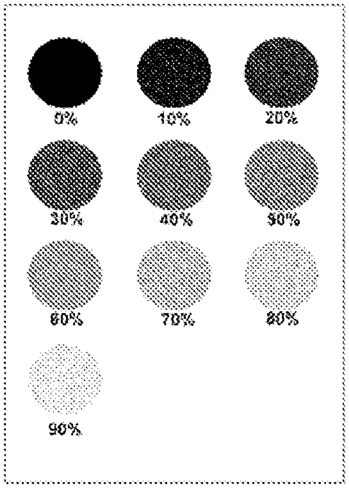

The printing is done on commercially available sublimation desktop printers. The print file includes 10 round color fields with differently declining amounts of ink to be printed in black. The print field at the top left is printed with 100% ink quantity, and the following ones with 10% less ink quantity in each case. Under the print fields, the designation of the field is in % and is specified as 100%—applied ink quantity in %. For example, the ink field printed with 80% ink quantity is denoted by the inscription 20%. FIG. 2 shows the print file.

TABLE 1

Transfer materials/*Advansa Standard 1.7-6-309 NSD was used

| Added barrier component in the base paper | Barrier component/ wt % | | Optical density | Ink penetration/ % | Tackiness in the transfer process | Curl average |
|---|---|---|---|---|---|---|
| without barrier component | 0 | Comparison | 4.31 | 80 | Rating 1 | 0 |
| without barrier component with additional barrier layer | 0 | Comparison | 4.45 | 20 | Rating 3 | 5 |
| PE Fibers (Advansa*) | 5 | Comparison | 4.38 | 50 | Rating 1 | 0 |
| Styrene-alkyl acrylate copolymer/PE fibers (Plexthol DV 544/ Advansa*) | 1/5 | Inventive | 4.37 | 30 | Rating 1 | 0 |
| Styrene-alkyl acrylate copolymer (Plexthol DV 544) | 1 | Comparison | 4.35 | 50 | Rating 1 | 1 |
| Styrene-alkyl acrylate copolymer (Plexthol DV 544) | 3 | Inventive | 4.32 | 25 | Rating 1 | 0 |
| Styrene-alkyl acrylate copolymer (Plexthol DV 544) | 5 | Inventive | 4.51 | 10 | Rating 2 | 0 |
| Cationic styrene-alkyl acrylate copolymer (Eurocryl 2324) | 1 | Comparison | 4.33 | 50 | Rating 1 | 1 |
| Cationic styrene-alkyl acrylate copolymer (Eurocryl 2324) | 5 | Inventive | 4.47 | 0 | Rating 2 | 0 |

The data listed in Table 1 show that the use of at least 1.5 wt %, relative to the mass of the pulp, of a polymer dispersion according to the invention in the base paper of the recording material according to the invention results in the desired barrier effect, i.e., in a low ink penetration. In this case, positive properties, such as the good optical densities, are maintained during the print, and a very good curl behavior and a low tackiness are to be observed in the transfer process. The combination of good barrier properties, low tackiness in the transfer process, and very good curl characteristics is achievable only with the recording materials according to the invention. The results in Table 1 show that this combination of properties cannot be achieved with the recording materials described in the prior art without a barrier layer or with an additional barrier layer and with recording materials having less than 1.5 wt %, relative to the mass of the pulp, of the polymer dispersion according to the invention in the base paper.

Methods

The resulting transfer materials were printed with a color image; in this case, the inkjet printer EPSON Workforce Pro WF 5110 with sublimation ink SubliJet IQ from Sawgrass was used.

After printing has taken place, the paper is placed under standard climatic conditions to dry for 1 h. Subsequently, the sublimation process is carried out in the Sefa ROTEX AUTO X REL transfer press with height indicator. For this purpose, the open transfer press is heated to 200° C. After the temperature has been reached, the textile is first placed on the base heating plate, and thereafter the printed paper with the printed side in the direction of the textile. Directly thereafter, the so-called cover paper, which is an 80 $g/m^2$ copy paper made of bleached pulp, is placed on the rear side of the printed sublimation paper, and the transfer press is closed. Sublimation lasts for 30 seconds at medium contact pressure.

After the sublimation time has elapsed, the transfer press is opened, and the 3 layers are carefully separated from one another. The textile is discarded. The sublimation ink sublimes in the case of poor ink penetration to the rear side and, depending upon the intensity of the ink penetration, precipitates more or less on the copying paper. The amount of ink plays an important role. The higher the amount of ink on the printed sublimation paper, the higher the tendency towards ink penetration in the direction of the rear side or cover sheet.

Since color fields in different amounts of ink are located on the printed sublimation paper, the gradation of the ink penetration on the cover sheet is also visible. A visual inspection of the cover sheet is carried out to evaluate the ink penetration. The color field, which is still recognizable in daylight, is marked and indicated as a % value with respect to ink penetration.

Figure 3:
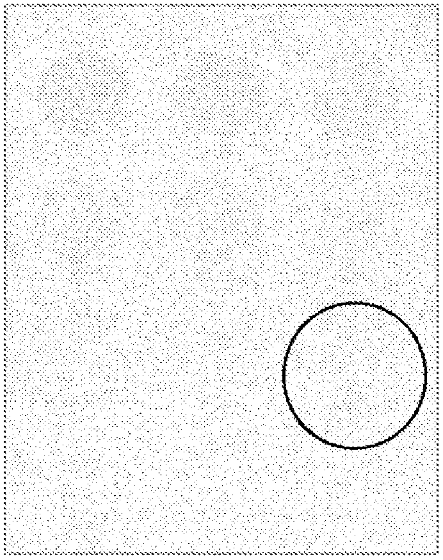
FIG. 3 shows, by way of example, the determination of the ink penetration of a cover sheet. The cover sheet, with marking of the bloom, which is just visually discernible at 80% constitutes a poor value in terms of ink penetration.
Figure 4:
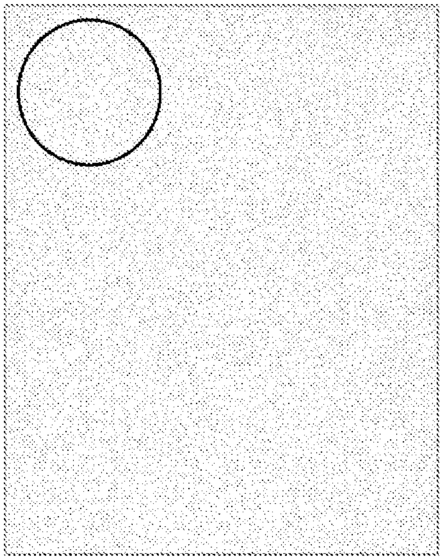
FIG. 4 shows, by way of example, the determination of the ink penetration of a cover sheet. The cover sheet is blank and constitutes a very good barrier effect against sublimation ink.

Values of 70-90% are obtained for a sublimation paper with poor ink penetration. For papers with improved ink penetration, values of 60-40% are obtained. Papers with very good behavior against ink penetration achieve values of 30-0%. An exact scaling of the tendency towards ink penetration can be specified in % values. FIG. 3 shows, by way of example, the cover sheet, with marking of the bloom, which is just visually discernible at 80% and constitutes a poor value in terms of ink penetration. With a paper which has a very good barrier effect against sublimation ink, there is nothing to be seen on the cover sheet (FIG. 4).

Determining the Tackiness in the Transfer Process

The tackiness of the rear side of the transfer material is determined by means of a haptic evaluation. For this purpose, the transfer material is positioned between two fingers and fixed with as uniform a pressure as possible. When the fingers are detached, the tackiness compared to known transfer material samples is determined in a rating system from 1 to 5. A rating of 2 or more is desirable for the transfer process to run smoothly.

Rating 1: no tackiness
Rating 2: slight tackiness
Rating 3: average tackiness
Rating 4: strong tackiness
Rating 5: very strong tackiness Determining the Curl Average The curl average is tested with three DIN A4 samples of the transfer materials according to the invention or transfer materials of the prior art (comparative examples) listed in Table 1. In preparing the DIN A4 samples from the test strip of the paper machine, it should be ensured that they are taken at the following points (see also FIG. 5):

1. FS edge: DIN A4 sample approx. 1.5 cm from tender side edge
2. M: DIN A4 sample from the middle of the paper web
3. AS: DIN A4 sample approx. 1.5 cm from the drive edge (AS edge)

The prepared samples are labeled on the client side (FS, M, AS) and stored with the client side facing upwards for 30 minutes at 50±2% relative humidity and 23±1° C. on a smooth surface.

The curl average value is determined by calculating for each DIN A4 sample the mean value from the measured four corner points of the respective sample, which are designated as shown in FIG. 5 with the numbers 1-4, 5-8, and 9-12, and by forming the average value from these 3 average values of the individual DIN A4 samples, i.e., the curl average value is the average value of the 3 calculated average values of the individual DIN A4 samples. The following evaluation scheme applies to the determination of each individual curl value at a single corner point of the DIN A4 sample:

0=no curl
1-3 cm=slight curl
>3 cm=curl not acceptable

In this case, the distance from the point at which the corner point was located prior to the start of the determination is measured, i.e., prior to storage under the above-mentioned predefined conditions (temperature, relative humidity) for 30 minutes, to the part of the DIN A4 sample, which, after 30 minutes at the above-mentioned predefined conditions (temperature, relative humidity), starting from the original point of the corner point diagonally to the center of the DIN A4 sample (intersection point in the center of the DIN A4 sample, which forms when imaginary straight lines are drawn from each corner point diagonally to the next corner point), is still resting flat on the smooth surface, i.e., the part of the DIN A4 sample which still rests on the smooth surface after the rolling up—which may occur—of the corner of the sample.

The curl average value is determined by calculating for each DIN A4 sample the mean value from the measured four corner points of the respective sample, which are designated as shown in the above illustration with the numbers 1-4, 5-8, and 9-12, and by forming the average value from these 3 average values of the individual DIN A4 samples, i.e., the curl average value is the average value of the 3 calculated average values of the individual DIN A4 samples. The following evaluation scheme applies to the determination of each individual curl value at a single corner point of the DIN A4 sample:

0=no curl
1-3 cm=slight curl
>3 cm=curl not acceptable

In this case, the distance from the point at which the corner point was located prior to the start of the determination is measured, i.e., prior to storage under the above-mentioned predefined conditions (temperature, relative humidity) for 30 minutes, to the part of the DIN A4 sample, which, after 30 minutes at the above-mentioned predefined conditions (temperature, relative humidity), starting from the original point of the corner point diagonally to the center of the DIN A4 sample (intersection point in the center of the DIN A4 sample, which forms when imaginary straight lines are drawn from each corner point diagonally to the next corner point), is still resting flat on the smooth surface, i.e., the part of the DIN A4 sample which still rests on the smooth surface after the rolling up—which may occur—of the corner of the sample.

What is claimed is:

1. A transfer material for a dye sublimation process, comprising a base paper, which is coated on one side with a color-receiving layer, characterized in that the base paper contains at least 1.5 wt %, relative to the mass of the pulp, of a polymer dispersion selected from polyacrylates, polyesters, polyolefins, or mixtures thereof.

2. The transfer material according to claim 1, characterized in that the base paper contains at least 3 wt %, relative to the mass of the pulp, of a polymer dispersion.

3. The transfer material according to one of the preceding claims, characterized in that the ink penetration of the transfer material is less than 30%, and preferably less than 20%.

4. The transfer material according to claim 1, characterized in that the base paper further contains at least 5 wt %, relative to the mass of the pulp, of pigment.

5. The transfer material according to claim 4, characterized in that the pigment is a hydrophobic pigment.

6. The transfer material according to claim 5, characterized in that the hydrophobic pigment is selected from the group consisting of kaolin, calcium carbonate, aluminum and magnesium silicates, silicas, or mixtures thereof.

7. The transfer material according to claim 5 or 6, characterized in that the hydrophobic pigment has a specific surface area greater than 80 $m^2/g$.

8. The transfer material according to claim 1, characterized in that the base paper further contains at least 5 wt %, relative to the mass of the pulp, of synthetic fibers.

9. The transfer material according to claim 1, characterized in that the polymer dispersion is distributed uniformly within the thickness of the base paper.

10. Method A method for producing a transfer material according to claim 1, comprising the following steps:

(a) producing a base paper on a paper machine, wherein at least 1.5 wt %, relative to the mass of the pulp, of a polymer dispersion selected from the group consisting of polyacrylates, polyesters, polyolefins, or mixtures thereof are added to the pulp suspension during production of the base paper;

(b) drying and smoothing the base paper;

(c) applying the color-receiving layer to a surface of the base paper; and (d) drying the transfer material obtained in step (c).

11. The method according to claim 10, characterized in that the process between step (a) and step (b) comprises the following additional step (a1):

(a1) impregnating the base paper with an impregnation solution comprising at least 1.0 g/$m^2$ of a polymer dispersion selected from the group consisting of polyacrylates, polyesters, polyolefins, or mixtures thereof, in a size press or film press.

12. The method for transferring an image onto a receiving material by sublimation, characterized in that a transfer material according to claim 10 is printed with an image by means of the inkjet printing process, and the image is transferred onto a receiving material by sublimation.

13. The method according to claim 12, characterized in that the receiving material is selected from polyester fabric, polyester nonwoven, or a material coated with polyester.

* * * * *